(12) United States Patent
Haddox et al.

(10) Patent No.: US 7,539,978 B1
(45) Date of Patent: May 26, 2009

(54) METHOD FOR UNDERSTANDING AND TESTING THIRD PARTY SOFTWARE COMPONENTS

(75) Inventors: Jennifer M. Haddox, Sterling, VA (US); Gregory M. Kapfhammer, Cochranton, PA (US); Ryan Colyer, Meadville, PA (US); Timothy Tsai, Bridgewater, NJ (US)

(73) Assignee: Cigital, Inc., Dulles, VA (US)

( * ) Notice: Subject to any disclaimer, the term of this patent is extended or adjusted under 35 U.S.C. 154(b) by 756 days.

(21) Appl. No.: 10/285,576

(22) Filed: Nov. 1, 2002
(Under 37 CFR 1.47)

Related U.S. Application Data

(60) Provisional application No. 60/330,879, filed on Nov. 1, 2001.

(51) Int. Cl.
*G06F 9/44* (2006.01)
(52) U.S. Cl. .................. 717/130; 717/126; 717/131
(58) Field of Classification Search .............. 717/124
See application file for complete search history.

(56) References Cited

U.S. PATENT DOCUMENTS

| | | | | |
|---|---|---|---|---|
| 5,590,329 A | * | 12/1996 | Goodnow, II et al. | 717/144 |
| 5,745,767 A | * | 4/1998 | Rosen et al. | 717/124 |
| 5,907,709 A | * | 5/1999 | Cantey et al. | 717/141 |
| 5,909,580 A | * | 6/1999 | Crelier et al. | 717/141 |
| 5,910,903 A | * | 6/1999 | Feinberg et al. | 703/6 |
| 6,321,376 B1 | * | 11/2001 | Willis et al. | 717/124 |
| 6,442,750 B1 | * | 8/2002 | Lopes et al. | 717/126 |
| 6,460,175 B1 | * | 10/2002 | Ferri et al. | 717/103 |
| 6,530,039 B1 | * | 3/2003 | Yang | 714/38 |
| 6,662,359 B1 | * | 12/2003 | Berry et al. | 717/130 |
| 7,024,592 B1 | * | 4/2006 | Voas et al. | 714/47 |
| 7,062,753 B1 | * | 6/2006 | Ward et al. | 717/124 |
| 7,137,105 B2 | * | 11/2006 | Madsen et al. | 717/128 |
| 2002/0133807 A1 | * | 9/2002 | Sluiman | 717/124 |
| 2003/0097650 A1 | * | 5/2003 | Bahrs et al. | 717/124 |

OTHER PUBLICATIONS

"An Approach to Identifying and Understanding Problematic COTS Components", Aug. 22, 2000, 11 pages. Online retrieved at <http://www.utdallas.edu/~weiminma/public/docs.htm>.*
"Testing Commercial-off-the-Shelf Software Components with Software Wrappers", Haddox et al., Jun. 2001. Online retrieved at <http://www.cigital.com/labs/security/malicious.php>, pp. 1-14.*
"Why COTS Software Increases Security Risks", McGraw, 1998. Online retrieved at <www.rstcorp.com/ots/COTS-security1.ppt>, pp. 1-38.*
"An Approach to Testing COTS Software for Robustness to Operating System Exceptions and Errors", Gosh et al., Nov. 1999. Online retrieved at <http://www/cigital.com/papers/download/akg-issre99.pdf>, pp. 1-9.*

(Continued)

*Primary Examiner*—Tuan Q Dam
*Assistant Examiner*—Thuy Dao
(74) *Attorney, Agent, or Firm*—Edell, Shapiro & Finnan, LLC

(57) ABSTRACT

Systems and methods to understand how commercial-off-the-shelf (COTS) software components interact with a system when the COTS components are integrated into a system. A software wrapping technology is utilized to encase the COTS software components such that a wrapper isolates the COTS components during testing.

19 Claims, 5 Drawing Sheets

OTHER PUBLICATIONS

Network Associates Labs, "Secure Execution Environments," Generic Software Wrappers for Security and Reliability; found on the Internet at: http://www.nai.com/research/nailabs/secure-execution/wrappers.asp, Mar. 25, 2003.

Vo, Kiem-Pheng et al., "Xept: A Software Instrumentation Method for Exception Handling," Eighth International Symposium on Software Reliability Engineering, IEEE, Nov. 1997, pp. 60-69.

Aspect J. Development Tools, "aspectj project," found on the Internet at: http://dev.eclipse.org/viewcvs/indextech.cgi/~checkoutaspectj-home/aspectj.html, Mar. 25, 2003.

Bytecode Engineering Library, JOIE: The Java Object Instrumentation Environment; found on the Internet at http://www.cs.duke.edu/ari/joie/joie.html.bak, Mar. 25, 2003.

Byte Code Engineering Library, "BCEL," found on the Internet at http://jakarta.apache.org/bcel, Mar. 25, 2003.

"Javassist Home Page," found on the Internet at http://www.csg.is.titech.ac.jp/~chiba/javassist, Mar. 25, 2003.

"Welcome to OpenJava," OpenJava: An Extensible Java, found on the Internet at http://www.csg.is.titech.ac.jp/openjava, Mar. 25, 2003.

* cited by examiner

METHOD FOR UNDERSTANDING AND TESTING THIRD PARTY SOFTWARE COMPONENTS

This application claims the benefit of U.S. Provisional Application No. 60/330,879, filed Nov. 1, 2001, which is herein incorporated by reference in its entirety.

BACKGROUND

1. Field of the Invention

The present invention relates generally to a computer development, and more particularly to providing a system and method for assessing software components that are to be integrated with other components.

2. Background of the Invention

The use of third party software components, such as commercial-off-the-shelf (COTS) products, has become more and more common in the building and maintenance of large software systems. Corporate downsizing and decreased government budgets, as well as the upward spiraling costs of building and maintaining large software systems, have necessitated a reuse of existing software components. Generally, reuse of existing software components is more cost effective than creating new software components. Reuse of existing software can also reduce the time-to-market for the software system. For these reasons, the use of COTS software components has become increasingly prevalent in recent years, which is evidenced by the fact that most of today's large software systems incorporate COTS components, along with legacy software and custom-built components.

COTS components may be defined as components that are bought from a third-party vendor and integrated into a new system. A COTS component may be as small as a routine that computes a square root of a number or as large as an entire library of functions. Generally, the COTS component of a new system is an existing product created by people outside of the software development organization that develops or used the new system.

Associated with the widespread use of COTS component is a new set of problems that do not exist if large systems are built and maintained using custom-built software. For example, a source code for a COTS component is rarely made available to a buyer. Thus, the COTS component must be analyzed and tested as a "black box." Determining the COTS component's behavior can be a challenge, particularly if the COTS component does not behave as expected. Even if the source code were available, determining how the COTS component will behave once the COTS component is integrated into a software system can still be difficult.

In addition, updates and evolution of a COTS component by the vendor can result in further modification to the software system. In some cases, a new functionality of an updated COTS component could be detrimental to the software system.

Furthermore, the vendor often fails to provide a correct or complete description of the COTS component's behavior. This can result in the buyer of the COTS component having to guess how the COTS component is meant to be used or how the COTS component is supposed to behave. Worse yet, the buyer could end up using the COTS component in a manner not intended by the vendor. Unanticipated uses could compromise the reliability of both the COTS component and the software system into which the COTS component is integrated.

Moreover, maintenance can become an issue because the vendor may not correct defects or add enhancements as the buyer needs them. Developers in the organization that purchased the COTS component may be forced to make modifications themselves, which can be difficult if the component's source code is unavailable or if the component's specification is poor.

Clearly, integrating COTS components into a software system is prone to errors that can require a significant amount of coding and can be problematic to test properly.

SUMMARY OF THE INVENTION

The present invention provides systems and methods for assessing software components that are to be integrated with other components or a system. A preferred embodiment of the present invention provides a methodology and tool for assessing a third-party vendor component which is used in a larger scale component or a system.

In one embodiment, a system of the invention isolates the component by wrapping the interfaces where it interacts with the system. The system then captures input and output data of the component, employs logic assertions to detect failure of the component, and uses fault injection to determine the effect of component failure upon the system.

In another embodiment, the invention utilizes a component wrapping technology to isolate the third party component and trap data and function calls going in and out of the component. The methodology captures input and output data from the component's interfaces to analyze the data in depth. Preferably, an assertions predication may be placed throughout the components interfaces to monitor the behavior of the component and the surrounding system. Fault injection may be applied to the interfaces to determine the effect of erroneous data, erroneous code, and component failure upon the system or the component.

In another embodiment, the invention provides a tool that can be used to aid developers in testing and verifying COTS components. The embodiment preferably provides a methodology and tool for understanding and testing third party software components. The embodiment preferably provides an aid to developers when they attempt to integrate a COTS component into their applications. Based on the notion of software wrapping, the embodiment preferably focuses on helping system integrators gain an improved understanding of how a COTS component interacts with the rest of the system into which it is integrated. The embodiment provides system integrators with a strategy for dealing with COTS components without becoming any more dependent on the vendor of the component than necessary.

In one embodiment, the system includes a wrapping subsystem, a data recording subsystem, a fault injection subsystem, an assertions predication subsystem, a data decomposer, and a mediator. The wrapping subsystem encases a COTS component. The data collection subsystem records input data and output data of the COTS component. The fault injection subsystem modifies the input data and the output data of the COTS component. The assertions predication subsystem evaluates the input data and the output data of the COTS component. The mediator serves as a channel of communication between wrapped COTS component and the subsystems. The data decomposer decomposes complex objects into simple primitive types.

In another embodiment, the present invention intercepts a class before the class is loaded into the Java Virtual Machine (JVM) and inserts bytecode into it to allow its input and output to be captured. The modified version of the class is then loaded into the JVM. The different types of testing operations are then applied to the modified version of the class in the JVM.

In another embodiment, the invention monitors and verifies a component's behavior through testing when the component is first being integrated into a main system.

DETAILED DESCRIPTION OF THE INVENTION

The present invention provides a tool and methodology for assessing a behavior of a third-party vendor component when the component is used in a system. The present invention provides a testing system that can be used to understand how a COTS component interacts with a system when the COTS component is integrated into the system. By understanding how a COTS component interacts with the system, system integrators can mitigate a risk that occurs when using COTS components. The present invention can be applied regardless of an availability of a source code for the COTS component. The present invention can also be applied regardless of the vendor's degree of involvement following the purchase of the COTS component.

The present invention utilizes a software wrapping technology that uses an additional layer of software, called a wrapper, to encase the COTS component. The wrapper intercepts input and output of the COTS component. The wrapper isolates the COTS component during testing process to understand whether the COTS component is interacting with the rest of the system as expected.

Once access to the input and output of the COTS component is gained via the wrapping, a variety of testing operations can be performed to provide an improved understanding of the COTS component's interaction with the rest of the system. For example, testing techniques such as fault injection, data collection, and assertions checking can be applied. The fault injection technique corrupts input and output data with scenarios not found in typical testing process. The data collection technique exports various internal data states of the system to, for example, a file or a database, for later observation. The assertions checking technique uses assertions, which are rules for system behavior defined by the developer. The assertions specify acceptable behavior at component interfaces. The rules are integrated into the system and checked at runtime. If a rule is violated, then an error handling code may be executed to handle the situation. Generally, the user of the system that implements the wrapping approach can decide which testing technique or techniques to use.

The wrapper can be hooked up to a mechanism that monitors, records, and/or stores the input and output of the component for observation. This can be particularly helpful when the system includes multiple COTS components. For example, consider a situation where one COTS component's output becomes another COTS component's input and source code is not available for either component. If both components are encased in wrappers, then the user can get a glimpse as to what is occurring when the two components interact.

Reference will now be made in detail to the preferred embodiments of the present invention, examples of which are illustrated in the accompanying drawings.

Figure 1:
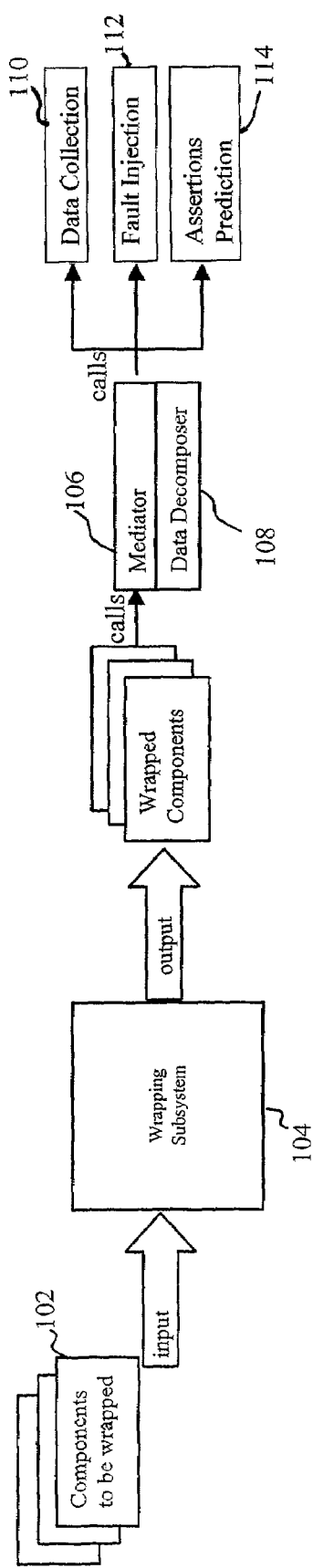
FIG. 1 is a schematic diagram showing one embodiment of the invention.

FIG. 1 is a schematic diagram illustrating an overview of a testing system according to a preferred embodiment of the present invention.

As shown in FIG. 1, testing system 100 of the present invention includes wrapping subsystem 104, data collection subsystem 110, fault injection subsystem 112, and assertions predication subsystem 114. Testing system 100 also includes data decomposer 108 and mediator 106. Component 102 is an exemplary COTS component that is to be integrated into a software system or application.

Wrapping subsystem 104 encases component 102 with a "wrapper." Wrapping subsystem 104 intercepts component 102 and instruments component 102 so that calls made from the software system to component 102 are intercepted by a mediator code that performs other operations. The wrapper intercepts input data send from the software system to component 104 and output data sent back from component 104 to the software system.

Data collection subsystem 110 performs data collection tests. Data collection subsystem 110 records the input data and the output data of component 102 at the component's wrapped interfaces. Fault injection subsystem 112 performs fault injection tests. Fault injection subsystem 112 modifies the input data and the output data of component 102. Assertions predication subsystem 114 performs assertions checking tests. Assertions predication subsystem 114 evaluates the input data and the output data of component 102 for desired logical conditions. Data collection subsystem 110, fault injection subsystem 112, and assertions predication subsystem 114 can be invoked by a wrapped component. The subsystems are described in details below.

Mediator 108 serves as a channel of communication between wrapped component 102 and subsystems 110, 112, and 114. Mediator 108 implements a specific interface. Mediator 108 defines a specified set of methods. When wrapping subsystem 104 performs the instrumentation, wrapped component 102 calls the specified set of methods. Mediator 108 receives information from the wrapped component and forwards the information to subsystems 110, 112 and 114.

Data decomposer 108 decomposes complex objects into simple primitive types so that an operation can be performed on the simple type The subsystems of the preferred embodiment are now described in details.

Wrapping Subsystem

Figure 2:
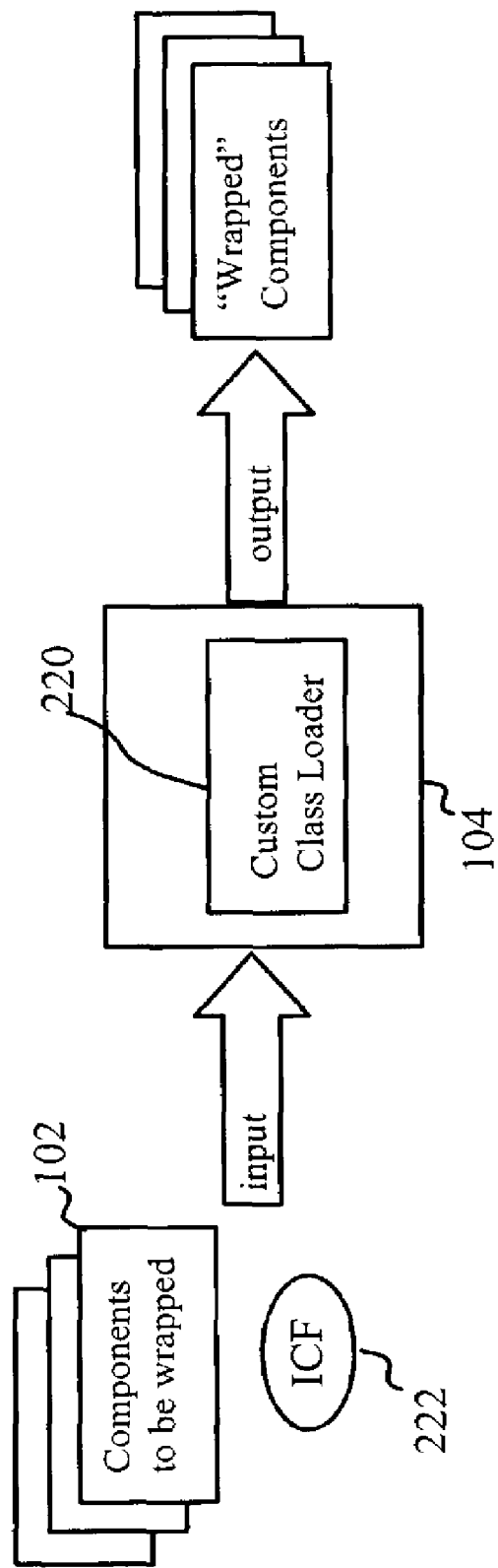
FIG. 2 is a schematic diagram showing an overview of a wrapping subsystem according to a preferred embodiment of the present invention.

FIG. 2 is a schematic diagram illustrating an overview of wrapping subsystem 104 according to the preferred embodiment of the present invention.

Wrapping subsystem 104 intercepts component 102 and instruments component 102 so that input data and output data of component 102 can be captured. The instrumentation process modifies a code of the software system and/or the component to perform variety of operations, such as data collection and assertions evaluation. The code may be, for example, a source code, an object code, or an executable code.

For example, a component called "Component" with a method called "method( )" is a component to be wrapped. A system called "System" makes a call to the component.

```
Class Component {
Public method(Data some_data);
}
Class System {
Public doSomething( ) {
    Call Component.method(some_data);
  }
}
```

Wrapping subsystem 104 intercepts (or traps) data at different locations in the component. For example, wrapping subsystem 104 may intercept the data at entry points, preferably at all entry points, to methods or functions of the component. Wrapping subsystem 104 may also intercept the data at exit points, preferably at all exit points, from the methods or functions in the component, including any return statement within a method or a logical end of a code where it automatically returns. Further, wrapping subsystem 104 may intercept any uncaught exception that is thrown by the method or by another class called by the method. The wrapping subsystem does not change the core functionality of any program that utilizes the wrapped component. The wrapping mechanism may be turned on and off at system start-up time. This can be achieved by adding a "wrapper flag" to a command line statement that starts the system to indicate that wrappers should be active.

Wrapping subsystem 104 may use a variety of methods to intercept (trap) the data. Some possible methods are as follows.

First, the wrapping subsystem may modify the component's interfaces. This can be achieved by changing a name of the component and creating a wrapper with the original component's name. For example, in the exemplary component "Component" shown above, the wrapping subsystem may change the name of the component to be "OriginalComponent" and create a wrapper with the original component's name, (i.e., "Component"). Any call to the component will now be directed to the wrapper. The wrapper will be responsible for capturing the "some_data" values and marshalling the call on to the "OriginalComponent."

Second, the wrapping subsystem may modify calls from the system to intercept the component data. This can be achieved by changing the calls in the software system to call a wrapped component, without changing the name of the component. For example, in the exemplary component "Component," the wrapping subsystem may change the calls in the software system to call "WrappedComponent" instead of "Component." The "WrappedComponent" will now be responsible for marshalling calls off to the original component "Component."

Third, the wrapping subsystem may modify the component with a wrapper code. This can be achieved by injecting an appropriate code into the component methods to apply a test technique, such as the data collection, the fault injection, or the assertions evaluation. This can be achieved without changing the component's interfaces.

Instrumenting the component involves parsing a code and building an internal representation that can be processed. The present invention can be applied to a source code, an object code, or even executable code.

Figure 3:
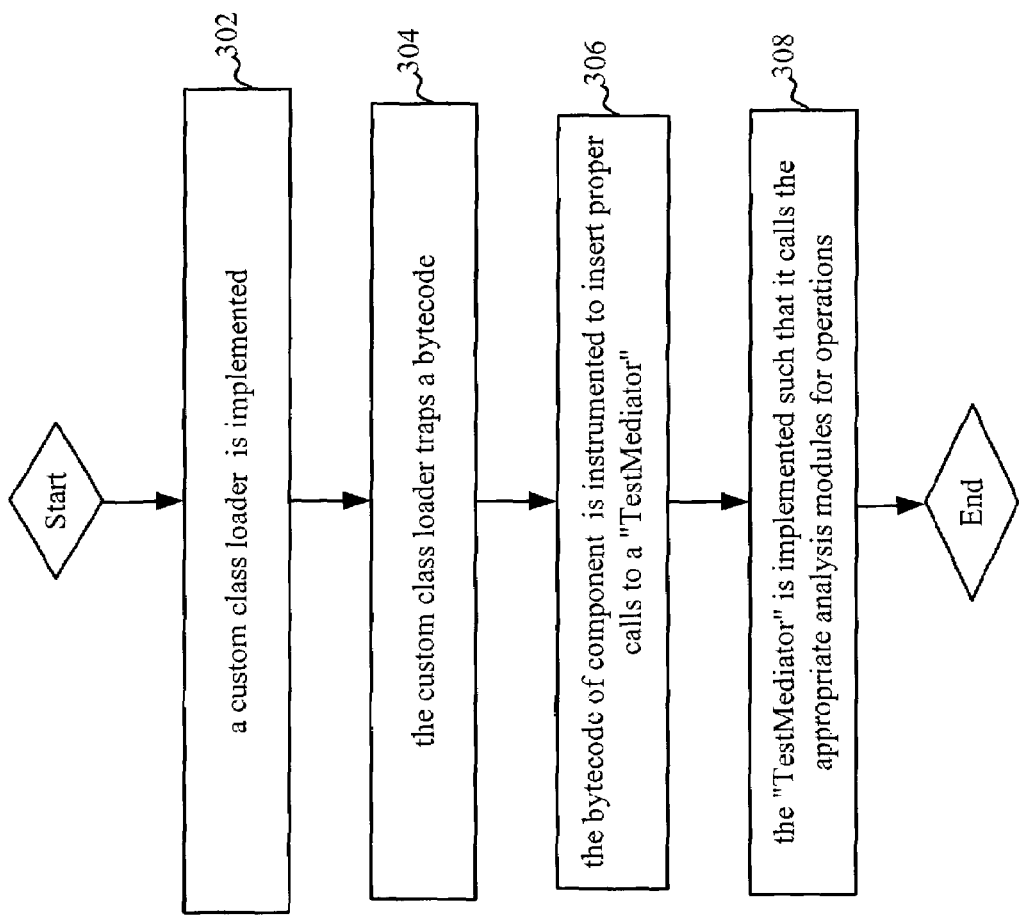
FIG. 3 is a flow diagram showing exemplary steps that may be used according to a preferred embodiment of the present invention.

FIG. 3 shows a flow diagram showing exemplary steps that may be used according to the preferred embodiment of the present invention. The Java programming language is used to implement this embodiment. However, the present invention is not limited to Java. The present invention can be applied to any suitable programming language. Furthermore, in this example, the present invention processes Java bytecode in preferred embodiment. The present invention is not limited to Java bytecode. The present invention may be extended to operate on source code.

In step 302, custom class loader 220 that plugs into a Java Virtual Machine (JVM) is implemented in the testing system of the present invention. The JVM is a standard runtime engine for running a Java code. The JVM uses a module called a "class loader" to load the java code that will be executed at run time. The JVM also provides a standard interface for providing a custom class loader, such as custom class loader 220.

In step 304, custom class loader 220 intercepts a bytecode for component 202 when the bytecode is loaded prior to execution. Custom class loader 220 parses the bytecode to an internal format that can be instrumented with the proper code for wrapping the component. Custom class loader 220 may use a third party product, such as JavaClass, to parse and instrument the bytecode.

In step 306, the bytecode of component 202 is modified (i.e., instrumented) to insert proper calls to a "TestMediator" with the components input and output data.

In step 308, the "TestMediator" is implemented such that it calls the appropriate analysis modules for operations, such as the data collection, the fault injection, or the assertions evaluation in this example.

The user can create a file, such as Instrumentation Configuration File (ICF) 222, to configure the component wrapping process. ICF 222 can be used to specify (1) Java packages to be instrumented, (2) classes within the Java packages to be instrumented, and (3) methods within the classes to be instrumented. ICF 222 then becomes input to the testing system of the present invention. Based on what is specified in ICF 222, certain classes are intercepted, instrumented, and then loaded into the JVM by custom class loader 220.

Once the bytecode has been modified, the JVM proceeds with normal execution of the system. When a call to "Component" is made, mediator 106 (in FIG. 1) is invoked to perform an appropriate analysis.

Data Decomposer

Data decomposer 108 decomposes complex object types into simple primitive types. For example, an exemplary object "BankRecord" consists of a "Name" and an "AccountNumber." The Name is a string type, and the AccountNumber is an integer type. Data decomposer 108 breaks down the object "BankRecod" so that other subsystems can act on the simple types (i.e., the string and the integer) to perform various operations.

Data decomposer 108 is invoked by a code that is injected into each method during instrumentation. After decomposing a complex data into its integral parts, data decomposer 108 invokes different analysis subsystems on the data. This invocation may be performed through a "mediator" class. The "mediator" may be configured to do any of the particular analyses depending on the user's needs.

Data decomposer 108 may use a run time type examination abilities of Java such as a "reflection." For any given object, data decomposer 108 is able to examine the object's type information and traverse its structure to extract the individual data elements. For example, data decomposer 108 is able to deal with null objects, repeat references for cyclic object hierarchies, primitive types, N-dimensional arrays, and complex objects. Once the objects are decomposed, the testing system can mediates calls to any of the subsystems to perform various operations.

Data Collection Subsystem

Data collection subsystem 110 stores the data. For example, data collector subsystem 110 may store the following information:

- Object name;
- Fully qualified method name invoked from the component;
- Location type where data was recorded (entry, exit, or uncaught exception);
- For each primitive element: data type, name of variable, value of variable; and
- For each complex type: data type, name of variable, nested breakdown of each element within the type.

Data collection subsystem 110 may store the data in a file for readability. Data collection subsystem 110 may also store the data so that additional processing can be performed by other software systems. For example, storing the data in a database or a spreadsheet format would allow further analysis of the data.

Fault Injection Subsystem

Figure 4:
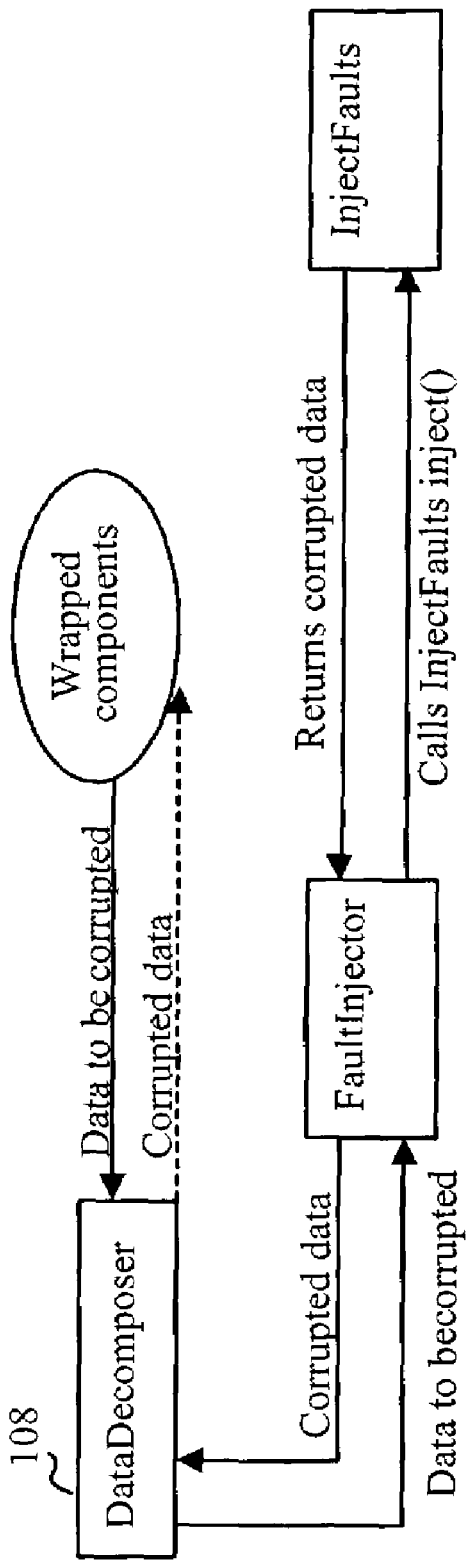
FIG. 4 is a schematic diagram showing an overview of fault injection subsystem according to a preferred embodiment of the present invention.

FIG. 4 is a schematic diagram illustrating an overview of fault injection subsystem 112. As shown, fault injection subsystem 112 receives data to be corrupted from data decomposer 108. Fault injection subsystem 112 then returns the modified (i.e., corrupted) data to data decomposer 108. Data decomposer 108 then forwards modified data to the remainder of the operational code in the original component. Fault injection subsystem 112 may be used with other subsystems, such as data collection subsystem 110 or assertions predication subsystem 114, to monitor the behavior and determine when the component (or the system) has invalid data that can lead to the system failure.

The fault injection function may be performed in either a directed or random approach. In the directed approach, specific faults are injected at specific places in the system, frequently monitoring for specific results. For example, an Account Balance in Bob's bank account could be set to $99 to see if a "bill customer for account balance less than $100" rule is activated in the system.

In the random fault injection, fault injection subsystem 112 uses a generic set of randomly selected perturbation functions to alter primitive data types of input and output of the component. The random fault injection approach may be applied at the component interfaces. For example, in the example above, the system might select an integer (Bob's account balance) and decrement it, possibly lowing it below the $100 limit and activating the rule in question. The random fault injection can also be easily performed multiple times to trigger more testing of the component. Fault injection subsystem 112 may operate on any types of the data. Some possible types of the data may include, for example, Int, Short, Byte, Float, Double, Long, Boolean, Char, and String.

The testing system of the present invention may implement, for example, the following fault perturbations:

- Increment number by n (n can be 1 or many);
- Decrement number by n (n can be 1 or many);
- Set number value to 0;
- Set number value to maximum for that data type;
- Set number value to minimum for that data type;
- Set number value to some random value;
- Reassign string to empty string of length 0;
- Reassign string to null; and
- Reassign string to randomly chosen substring of original string.

Fault injection subsystem 112 can be configured by using a file, such as a fault injection configuration file. The file may contain the following information:

- Types of data to be perturbed;
- Fault perturbations to be used on each of the types;
- Configuration of individual perturbation functions (i.e. set n to 5 for incrementing and decrementing); and
- Specify a "trigger" to determine which component methods will have fault injection applied and how frequently the perturbations occur.

The "trigger" is used to specify when and where faults are actually applied. For example, specifying "always Component.method( )" instructs the system to always apply faults at the interfaces for the method "method( )" in "Component." The user may also specify a tuple [x, y] to indicate that the fault injection will only be applied every n calls to method( ), where n is a random number between x and y. Fault injection subsystem 112 is invoked by data decomposer 108 at entry, exit, and uncaught exception points in each component method.

Assertions Predication Subsystem

Assertions predication subsystem 114 (i.e., anomaly predicate checking subsystem) evaluates logical assertions on input data and output data of the component. Assertions predication subsystem 114 is invoked by data decomposer 108 at entry, exit, and uncaught exception in each of the component's methods.

The testing system of the present invention allows the user to specify different types of assertions on input/output of a method. For example, the assertions may be preconditions, postconditions, or class invariants. The first type, preconditions, performs a validation check on input parameters to a specific method. The second type, postconditions, performs a validation check on output of a method (i.e., return value and "out" parameters). The third type of assertions, class invariants, is specific to object-oriented programming.

Preferably, the assertions prediction subsystem and the data collection subsystem are used in conjunction with each other. The assertions prediction subsystem can be used to create assertions that specifies how the interaction between various components in the system should occur. If one of these assertions is violated, the data that violated the assertion can be exported to a file for observation along with the assertion that was violated and the method in which the violation occurred.

The present invention may use Java's reflection mechanism and an "AccessibleObject" class to circumvent normal object oriented encapsulation and gain access to fields and method those are difficult to access. The testing system also provides access to static data and methods which are not associated with a particular instance of an object.

The user can create a file, such as an anomaly predicate configuration file, to specify the types of assertions used during the analysis. The assertions in the anomaly predicate configuration file specify where assertions are placed and which logical expressions are for the assertions. The following assertion is listed for illustration:

@package foo
@class TestClass
@invariant @staticAccess(int, TestClass, s_x)>10
@method myMethod(I)V
  @pre @1>100
  @post @instanceAccess(int, @CUT, m_y)<100
@endmethod
@endclass
@endpackage In this example, the system checks that the static member s_X is greater than 10 upon every invocation of a method within the component "TestClass" in the package "foo." The system checks that first parameter of method myMethod( ) is greater than 100 whenever that method is invoked. The system also verifies that the private member m_y is less than 100 whenever myMethod( ) completes.

In one embodiment, the anomaly predicate configuration file is read in and parsed to maintain these expressions. When data decomposer 108 encounters entry, exit, and uncaught exception calls to the component of interest ("TestClass" in the example above), it invokes assertions prediction subsystem 114 through mediator 106. Mediator 106 then evaluates the necessary data to validate the assertions. If one of the assertions is violated then the data and the assertion are recorded to a file to be reviewed by the user.

Testing Operation

The testing operation is now described in details.

Once access to the input and output data of component 102 is gained via wrapping subsystem 104, a variety of testing operations can be performed to provide an improved understanding of the component's interaction with the rest of the system. With the testing operations, the developers can identify scenarios where the interaction between the COTS component and the system could result in a system failure.

The developer can establish requirements for a system's interaction with COTS components. The requirements may include, for example, types of inputs the system will provide to the COTS components and types of information the system expects to receive back from the COTS components.

Figure 5:
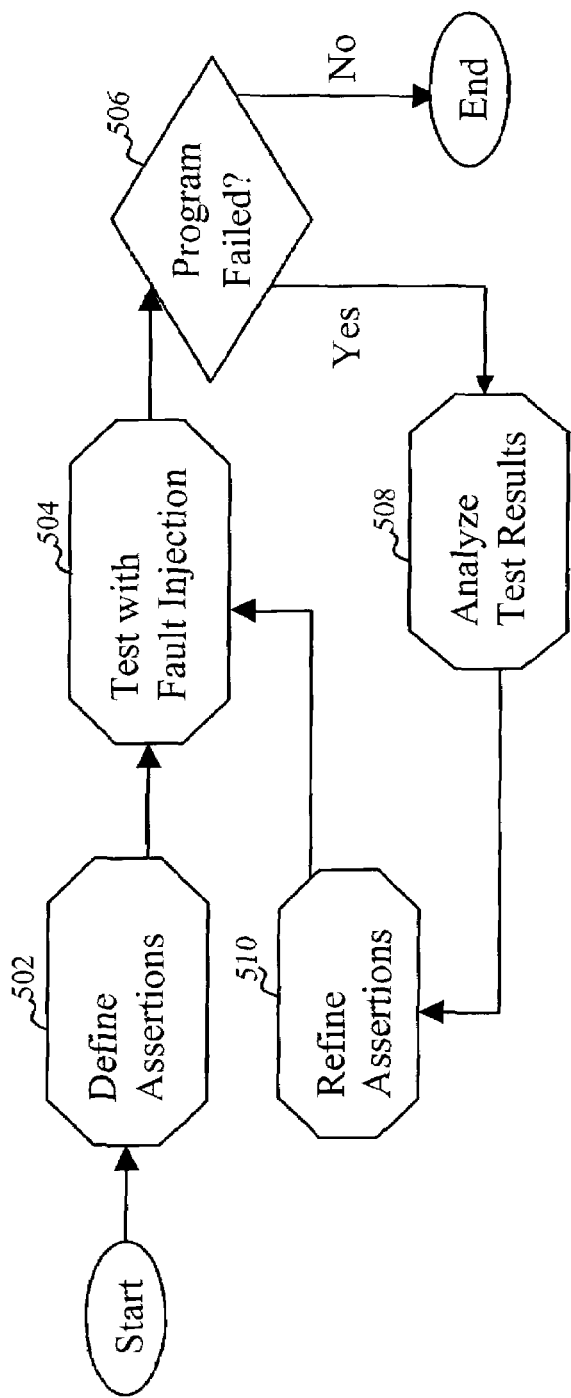
FIG. 5 is a flow diagram showing a methodology according to a preferred embodiment of the present invention.

FIG. 5 shows a flow diagram illustrating a methodology of an exemplary testing operation according to a preferred embodiment of the present invention. In the embodiment, testing techniques of the fault injection, the data collection, and the assertions checking are used. However, the present invention is not limited to those testing techniques. The user can create his or her own subsystem that would perform a testing operation on the captured input and output in conjunction with wrapping subsystem 104.

In step 502, assertions to govern how the component should interact with the rest of the system are defined.

In step 504, the component is tested with the assertions in place. During the execution the fault injection is applied at the component interfaces to determine under what situations the system (and the individual COT components) would fail. For example, the fault injection can be used to supplement input values that the COTS component would receive from the system. By using the fault injection to perturb the component's "normal" inputs, how the component react to inputs that are not usually encountered during a "normal" testing can be observed.

In step 506, the system (and the individual COT components) is checked for a system failure. If no system failure occurs, the process ends. Otherwise, the process goes to step 508.

In step 508, if the system failure occurred in step 506, the test results are analyzed to determine the cause of the system failure. For example, which kinds of inputs caused the system failure is determined.

In step 510, the assertions that define acceptable input of the component are refined based on the reaction of the components to the perturbed input.

The process then repeats steps 504 and 506.

The fault injection can also be applied to the COTS component's output to determine how the rest of the system will react to data produced by the COTS component. Once outputs that result in a system failure are identified, the assertions defining the component's output can be refined as well.

When an assertion in the system is violated by a fault injection or any other reason, the data collection can be used to export state information at locations in the code where the fault injection is applied. The data collection can also be used to collect the data at locations where the assertions failed. Furthermore, the data collection can be used to collect the data at specific locations. The data collection can be used to collect the information about an internal state of the system at a specific locations, thus providing the developer with helpful information if the system fails on a particular test run.

The following is an example.

Assume a group of developers has a component X that is to be integrated into their system. For a particular operation in X that takes an integer i as input, the developers create an assertion specifying that whenever the system invokes this operation, i must be greater than zero. The developers then specify that data collection be performed whenever this particular operation in X is invoked. When the developers test the entire system and apply fault injection to i, they may notice that X does indeed cause a system failure when i is less than zero. They may also note that X causes a failure when i is assigned values greater than one thousand. Thus, they may want to redefine their assertion to state that i must be greater than zero and less than one thousand.

By creating assertions and applying fault injection, and then studying the additional output of the program provided via the data collection, the developers can gain an improved understanding of how the COTS components are interacting with the application. The developers can then refine their assertions to account for potential failure situations that occurred. By repeating the process, assertions that will account for as many situations as possible that can result in system failure can be created.

Once these potential problem scenarios are discovered and assertions are created to account for them, the developers can take an appropriate action to mitigate the problem. For example, the developers can modify their own code to account for problems that could result from the COTS software being integrated into the system. The developers can also modify a custom built component or a component's behavior.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising:

encasing a first software component in a wrapper comprising a second software component comprising mediator code that encases the first software component such that calls made from a software system to the first software component are intercepted by the mediator code, wherein the mediator code performs operations different from operations of the first software component and wherein the mediator code contains a data decomposer that decomposes types of input data to the first software component into data type, name of element, and nested breakdown of each element within a given type of input data, wherein the variables represent at least one of strings, integers, floating point numbers, characters, Boolean values and/or pointers, wherein the data decomposer further decomposes a complex object into variables so that an operation can be performed on said variables, wherein the complex object comprises at least two variables; and performing, using the mediator code, one or more of a fault injection test on the first software component, an assertions checking test on the first software component, and a data collection test on the first software component, wherein for each decomposed complex object storing data type, name of variable, nested breakdown of each variable within the decomposed complex object, and wherein the data decomposer is invoked by a code that is injected into the first software component to use a mediator class to analyze n-dimensional arrays, perform various operations on null objects, and repeat references for cyclic object hierarchies.

2. The method of claim 1, further comprising using the mediator code to serve as a channel of communication between the first software component and one or more of a wrapping subsystem that encases the first software component, a fault injection subsystem that performs the fault injection test, an assertions predication subsystem that performs the assertions checking test, and a data collection subsystem that performs the data collection test.

3. The method of claim 2, further comprising:

receiving data from the data decomposer by the fault injection subsystem; and corrupting the data by the fault injection subsystem; and returning corrupted data to the data decomposer by the fault injection subsystem.

4. The method of claim 3, wherein the fault injection subsystem uses one of a random approach and a directed approach.

5. The method of claim 3, wherein the fault injection subsystem uses a generic set of randomly selected perturbation functions to alter primitive data types of input and output of the first software component.

6. The method of claim 2, further comprising:

receiving one or more of input data and output data associated with the first software component by the assertions predication subsystem; and evaluating a logical assertion on the one or more of the input data and the output data by the assertions predication subsystem.

7. The method of claim 6, wherein the logical assertion is one of a precondition, a postcondition, and a class invariant.

8. The method of claim 2, further comprising:

accessing one or more of input data and output data associated with the first software component by the data collection subsystem; and performing a testing operation to provide an improved understanding of the first software component's interaction with other components by the data collection subsystem.

9. The method of claim 8, further comprising establishing requirements for the interaction between the first software component and the other components.

10. A system, embodied in a computer, comprising:

a wrapping subsystem configured to encase a first software component, said wrapping subsystem comprising a second software component implemented as a Java custom class loader that causes the first software component to be encased by mediator code, such that calls made from a software system to the first software component are intercepted by the mediator code, where the mediator code contains a data decomposer that decomposes types of input data to the first software component into data type, name of variables, and nested breakdown of each variable within a given type of input data, wherein the variables represent at least one of strings, integers, floating point numbers, characters, Boolean values and/or pointers, wherein the data decomposer further decomposes a complex object into variables so that an operation can be performed on said variables, wherein the complex object comprises at least two variables; and the mediator code calls one or more of a fault injection subsystem configured to perform fault injection tests on the first software component, an assertions predication subsystem configured to perform assertions checking tests on the first component, and a data collection subsystem configured to perform data collection tests on the first software component, wherein for each decomposed complex object the data collection subsystem is configured to store data type, name of variable, nested breakdown of each element within the decomposed complex object; and wherein the data decomposer is invoked by a code that is injected into the first software component to use a mediator class to analyze n-dimensional arrays, perform various operations on null objects, and repeat references for cyclic object hierarchies.

11. The system of claim 10, wherein the mediator code is configured to serve as a channel of communication between the first software component and the one or more of the wrapping subsystem, the fault injection subsystem, the assertions predication system, and the data collection subsystem.

12. A method comprising:

encasing a first software component in a wrapper comprising a second software component that encases the first software component such that calls made from a software system to the first software component are intercepted by mediator code that performs operations different from operations of the first software component and that includes a data decomposer that decomposes types of input data to the first software component into data type, name of element, and nested breakdown of each element within a given type of input data, wherein the variables represent at least one of strings, integers, floating point numbers, characters, Boolean values and/ or pointers, wherein the data decomposer further decomposes a complex object into variables so that an operation can be performed on said variables, wherein the complex object comprises at least two variables;

for each decomposed complex object storing data type, name of variable, nested breakdown of each variable within the decomposed complex object; and intercepting calls to the first software component and instrumenting the first software component so that input data and output data of the first software component can be captured;

wherein the data decomposer is invoked by a code that is injected into the first software component to use a mediator class to analyze n-dimensional arrays, perform various operations on null objects, and repeat references for cyclic object hierarchies.

13. The method of claim 12, further comprising modifying a code of the first software component.

14. The method of claim 13, wherein the code is one of a source code, an object code, and an executable code.

15. The method of claim 13, wherein the first software component is modified to perform an operation.

16. The method of claim 15, wherein the operation is one of data collection and assertions evaluation.

17. The method of claim 12, further comprising intercepting data associated with the first software component at one or more of an entry point and an exit point, wherein intercepting data comprises preventing the wrapped first software component from obtaining data until the data has been examined and possibly modified by the wrapper, and preventing data created by the wrapped first software component from being obtained by other software until the data has been examined and possibly modified by the wrapper.

18. The method of claim 12, further comprising intercepting data associated with the first software component at all entry points wherein intercepting data comprises preventing the wrapped first software component from obtaining data until the data has been examined and possibly modified by the wrapper.

19. The method of claim 12, further comprising intercepting data associated with the first software component at all exit points, wherein intercepting data comprises preventing data created by the wrapped first software component from being obtained by other software until the data has been examined and possibly modified by the wrapper.

* * * * *